United States Patent [19]

Orbits et al.

[11] Patent Number: 5,237,673
[45] Date of Patent: Aug. 17, 1993

[54] MEMORY MANAGEMENT METHOD FOR COUPLED MEMORY MULTIPROCESSOR SYSTEMS

[75] Inventors: David A. Orbits, Redmond; Kenneth D. Abramson, Seattle; H. Bruce Butts, Jr., Redmond, all of Wash.

[73] Assignee: Digital Equipment Corporation, Maynard, Mass.

[21] Appl. No.: 673,132

[22] Filed: Mar. 20, 1991

[51] Int. Cl.$^5$ ............................................. G06F 12/00
[52] U.S. Cl. .............................. 395/425; 364/DIG. 1
[58] Field of Search ........................ 395/400, 425, 600

[56] References Cited

U.S. PATENT DOCUMENTS 4,775,932 10/1988 Oxley et al. .......................... 395/600

OTHER PUBLICATIONS

Cohen, J., *Computing Surveys;* "Garbage Collection of Linked Data Structures", vol. 13, No. 3, Sep. 1981, pp. 341–367.
Fenichel et al., *Communications of the ACM;* "A LISP Garbage-Collector for Virtual—Memory Computer Systems", vol. 12, No. 11, Nov. 1969, pp. 611–612.
Steele, Jr., G. L., *Communications of the ACM;* "Multiprocessing Compactifying Garbage Collection", vol. 18, No. 9, Sep. 1975, pp.

Primary Examiner—Joseph L. Dixon
Assistant Examiner—David L. Robertson
Attorney, Agent, or Firm—Christensen, O'Connor, Johnson & Kindness

[57] ABSTRACT

A method of managing the memory of a CM multiprocessor computer system is disclosed. A CM multiprocessor computer system includes: a plurality of CPU modules $11a \ldots 11n$ to which processes are assigned; one or more optional global memories $13a \ldots 13n$; a storage medium $15a, 15b \ldots 15n$; and a global interconnect 12. Each of the CPU modules $11a \ldots 11n$ includes a processor 21 and a coupled memory 23 accessible by the local processor without using the global interconnect 12. Processors have access to remote coupled memory regions via the global interconnect 12. Memory is managed by transferring, from said storage medium, the data and stack pages of a process to be run to the coupled memory region of the CPU module to which the process is assigned, when the pages are called for by the process. Other pages are transferred to global memory, if available. At prescribed intervals, the free memory of each coupled memory region and global memory is evaluated to determine if it is below a threshold. If below the threshold, a predetermined number of pages of the memory region are scanned. Infrequently used pages are placed on the end of a list of pages that can be replaced with pages stored in the storage medium. Pages associated with processes that are terminating are placed at the head of the list of replacement pages.

18 Claims, 10 Drawing Sheets

PHYSICAL MEMORY ALLOCATION VARIABLES

| VARIABLE NAME | UNITS | DESCRIPTION |
|---|---|---|
| REGION SIZE PARAMETERS | | |
| ENABLE | FLAG | 0 MEANS THIS MEMORY REGION IS DISABLED |
| FIRSTFREE | PAGE PFN | FIRST PAGE OF MEMORY IN REGION |
| MAXFREE | PAGE PFN | LAST PAGE OF MEMORY, PLUS ONE, IN REGION |
| MAXMEM | PAGES | NUMBER OF MAPPABLE PAGES IN MEM REGION |
| AVAILABLE MEMORY VARIABLES | | |
| FREEMEM | PAGES | AMOUNT OF FREE MEMORY AVALIABLE |
| AVEFREE | PAGES | 5 SEC FREEMEM MOVING AVERAGE |
| AVEFREE30 | PAGES | 30 SECOND FREEMEM MOVING AVERAGE |
| PAGING CONTROL PARAMETERS | | |
| LOTSFREE | PAGES | THRESHOLD TO START / STOP PAGING |
| DESSCAN | PAGES | DESIRED PAGES SCANNED PER PAGEOUT() CALL |
| SLOWSCAN | PAGES / SEC | RATE OF SLOW MOVING PAGE CLOCK |
| FASTSCAN | PAGES / SEC | RATE OF FAST MOVING PAGE CLOCK |
| CLOCK SCAN VARIABLE | | |
| FRONTHAND | CMAP INDEX | FRONT HAND OF CLOCK ALGORITHM FOR REGION |
| BACKHAND | CMAP INDEX | BACK HAND OF CLOCK ALGORITHM FOR REGION |
| NSCAN | COUNT | CMAP ENTRIES SCANNED BY PAGEOUT() IN CURRENT CALL |
| MAXHAND | CMAP INDEX | LAST CMAP ENTRY INDEX OF REGION |
| SWAPPING CONTROL PARAMETERS | | |
| DEFICIT | PAGES | MEMORY RESERVED BY SWAPPER AFTER SWAPOUT |
| MINFREE | PAGES | MINIMUM FREE MEMORY BEFORE SWAPPING |
| AVENRUN | COUNT | MOVING AVERAGE OF SWAPPABLE PROCESSES |
| NRUN | COUNT | NUMBER OF SWAPPABLE PROCESSES |
| DESFREE | PAGES | NUMBER OF PAGES TO TRY TO KEEP FREE |

FIG.3.

CORE MAP STRUCTURE

| CORE MAP ENTRY VARIABLE | DESCRIPTION |
|---|---|
| C_NEXT | INDEX OF NEXT FREE LIST ENTRY |
| C_REMOTE | CMAP ENTRY HASHED TO REMOTE A.OUT |
| C_FREE | ON THE FREE LIST |
| C_INTRANS | INTRANSIT BIT |
| C_CONE | ASSOCIATED PAGE HAS BEEN RELEASED |
| C_WANT | WANTED |
| C_LOCK | LOCKED FOR RAW I/O OR PAGEIN |
| C_TYPE | TYPE CSYS, CTEXT, CSTACK, CDATA OR CSMEM |
| C_PREV | INDEX OF PREVIOUS FREE LIST ENTRY |
| C_MDEV | WHICH MOUNTED DEV THIS IS FROM |
| C_HLINK | HASH LINK FOR [BIKNO.MDEV] |
| C_NDX | INDEX OF OWNER PROC OR TEXT |
| C_BLKNO | DISK BLOCK THIS IS A COPY OF |
| C_MEM_REGION | IDENTIFIES CM MEMORY REGION PAGE BELONGS TO |
| C_PAGE | VIRTUAL PAGE NUMBER IN SEGMENT |
| C_MIGRATE | MIGRATE ON DEMAND |
| C_REFONT | REF COUNT FOR FUTURE USE |

MEMORY MANAGEMENT METHOD FOR COUPLED MEMORY MULTIPROCESSOR SYSTEMS

TECHNICAL AREA

This invention relates to the memory management aspects of the operating system software of multiprocessor computer system having a non-uniform memory access architecture (NUMA) memory system interconnect design.

BACKGROUND OF THE INVENTION

NUMA designs attempt to take advantage of memory hierarchy because a process suffers less memory access latency (and runs faster) the closer the processor running the process is to the memory serving the processor. If memory access requires using a system interconnect, the resulting latency is high, in some cases high enough to be prohibitive. In addition to memory access latency savings, maintaining a process's memory locally and providing local access reduces use of the system interconnect. Reducing use of the system interconnect allows either more CPU modules to be connected to a given interconnect and/or faster processor speeds relative to the interconnect's bandwidth. Therefore, the primary goal of the memory management software used in a NUMA design is to store a process's most frequently used pages as close to the processor running the process as possible. At the same time, the operating system must minimize the time and resources required to satisfy this goal.

Recently several experimental multiprocessor computer systems have been developed that attempt to reduce memory access latency by distributing system memory. Each of these systems includes multiple processors, each with a local memory interconnected by either a bus or a butterfly network and some amount of global memory. See *Parallel Programming Using the MMX Operating System and Its Processor* by E. Gabber in Proceedings of the Third Israel Conference Computer System Software Engineering, Tel-Aviv, Israel, Jun. 6-7, 1988, pp. 122-23; *The Advanced Computing Environment Multiprocessor Workstation* by A. Garcia, D. J. Foster and R. F. Freitas, IBM Research Report RC 14491 (#64901), IBM T. J. Watson Research Center, March 1989; *Butterfly TM Parallel Processor Overview*, BBN Report No. 6148, Version 1, Mar. 6, 1986; and *The Uniform System Approach to Programming the Butterfly TM Parallel Processor*, BBN Report No. 6149, Version 2, Jun. 16, 1986. As best understood, each of these systems requires explicit management of the local memory storage by either the complier or the application programmer. Memory management is not controlled by the operating system.

Apparently some recent work at the University of Rochester has taken the Mach operating system and modified its memory management to treat local memory as a cache of pages stored in global memory. See *An Overview of PLATINUM: A Platform for Investigating Non-Uniform Memory* by R. Fowler and A. Cox, University of Rochester Technical Report 262, November 1988; and *The Implementation of a Coherent Memory Abstraction On an NUMA Multiprocessor: Experience with PLATINUM* by A. Cox and R. Fowler, University of Rochester Technical Report 263, May 1989. Because the University of Rochester approach does not allocate storage directly in local memory, it does not realize some of the interconnect bandwidth the savings achieved by the hereinafter-described invention. Moreover, treating local memory as a cache of pages in global memory has a number of disadvantages. First, treating local memory as a cache means that data stored in global memory is replicated in local memory. Thus, local memory does not add to overall system memory. Further, replicating data in system memory creates a high memory overhead, particularly because system memory is stored on a page basis and page sizes are relatively large. Recently, page sizes of 64K bytes have been proposed. In contrast cache memories store data in blocks of considerably smaller size. A typical cache block of data is 64 bytes. Thus, the "granularity" of the data replicated in system memory is considerably larger than the granularity of data replicated in cache memory. The large granularity size leads to other disadvantages. Greater interconnect bandwidth is required to transfer larger data granules than smaller data granules. Coherency problems are increased because of the likelihood that more processors will be contending for the larger granules than the number contending for smaller granules on a packet-to-packet basis.

Recently a new NUMA design multiprocessor computer system incorporating coupled memory (hereinafter often abbreviated throughout this application as "CM") has been developed. In a CM multiprocessor computer system, physical system memory resides on both CPU and memory modules. Regardless of where located, all memory appears as one common physical address space and is accessible by all processors in the system. The part of system memory that physically resides on a CPU module is known as a coupled memory (or CM) region. Each processor accesses its coupled memory (called a local reference) via a private port. Access to the coupled memory on other modules (called remote references) is made via the system interconnect. The coupled memory of each CPU module is considered a separate CM region, while the memory of all of the memory only modules is grouped into one region known as global memory (often abbreviated hereinafter as GM). GM can contain shared data used by more than one processor and/or act as an overflow resource when the CM region of a CPU module is insufficient. Although this invention is not limited to use in a CM model of a NUMA design, this model is used throughout the following description to explain the invention's details.

The present invention is directed to managing the CM regions of a coupled memory multiprocessor computer system in a manner that maintains memory latency and system interconnect usage at a low level.

SUMMARY OF THE INVENTION

In accordance with this invention, a method of managing the memory of a CM multiprocessor computer system is disclosed. The type of CM multiprocessor computer system with which the invention is useful includes at least a plurality of CPU modules, to which processes are assigned, and a storage medium connected to the CPU modules via a system (global) interconnect. Each of the CPU modules includes a processor and a CM region that is accessible by the local processor without using the global interconnect. Processors have access to remote CM memory regions via the global interconnect. Memory is managed by transferring, from the storage medium, the data and stack pages of a process to be run to the CM region of the CPU module to which the process is assigned, when the data and stack pages are called for by the process. At prescribed intervals, the free memory of each CM region is evaluated to determine if it is below a threshold. If below the threshold, a predetermined number of pages of the CM region are scanned. Infrequently used pages are placed on a list of pages that can be replaced with pages stored in the storage medium. Pages that are referenced by a local processor before they are replaced with other pages can be reclaimed from the list of replacement pages.

In accordance with further aspects of this invention, if the CM multiprocessor computer system includes global memory, i.e., memory not coupled to a specific CPU and accessible via the global interconnect, system pages, shared pages and text (or instruction) pages are allocated to global memory. If global memory is not present, system pages, shared pages and text (or instruction) pages can either be allocated to a specific CM region or spread among the CM regions.

In accordance with further aspects of this invention, if it becomes impossible for all of a process's data and stack pages to be located in the CM region of a CPU running a specific process, because, for example, the sum of memory demands made by all the processes running on a given CPU exceeds the size of that CPU's coupled memory, less recently used pages are written to storage if they have been changed and then written over, or merely written over, if unchanged.

In accordance with other aspects of this invention, if, for some reason, a process migrates to another CPU module, the CM pages associated with the migrating process are marked for migration as well. When the process runs on its new CPU module, the first time the processor of the CPU module references one of the marked pages, the page is copied into the CM region of the new CPU module and the page of the CM region of the old CPU module is freed. More specifically, it is preferable that each process run for its entire life on the processor of the same CPU module. This yields the best coupled memory benefit in terms of memory access latency and interconnect bandwidth. On the other hand, in some instances, load balancing considerations may override these benefits, making it optimal to migrate a process from one CPU module to another. The advantage of process migration and the scheduling techniques used to determine and control process migration are described in U.S. patent application Ser. No. 07/649,844 filed Feb. 1, 1991, and entitled "Affinity Scheduling of Processes on Symmetric Multiprocessing Systems," the subject matter of which is incorporated herein by reference.

The key advantage of this invention is to allocate process memory storage in the CM region of the CPU module to which the process has been assigned. This reduces memory access latency and system interconnect usage for all processes on the system. This, in turn, permits each process to perform its computing in less time, and allows more CPU modules to be connected to a given system interconnect before exhausting the interconnect's ability to handle memory traffic. In addition, a computing system with CM regions is lower in cost than a system that includes one or more large capacity caches, or multiple levels of cache. This is because coupled memory is memory that can be directly utilized by programs while a large cache adds memory cost above and beyond the cost of the system memory required to back up the cache. Further, operating system memory management software can be used to control how much coupled memory a process uses whereas operating system memory management software can't control how a process uses a hardware-managed cache. For example, the operating system can choose to limit the amount of coupled memory used by a process that has poor memory reference locality. Thus, the operating system can prevent a badly behaved process from degrading both the performance of other processes (by causing them to have increased cache miss rates) as well as overall system performance (due to uncontrolled system interconnect usage).

BRIEF DECRIPTION OF THE DRAWINGS

The foregoing and other advantages of the present invention will become more readily appreciated as the same becomes better understood by reference to the following detailed description when taken in conjunction with the accompanying drawings wherein.

DESCRIPTION OF THE PREFERRED EMBODIMENT

Figure 1:
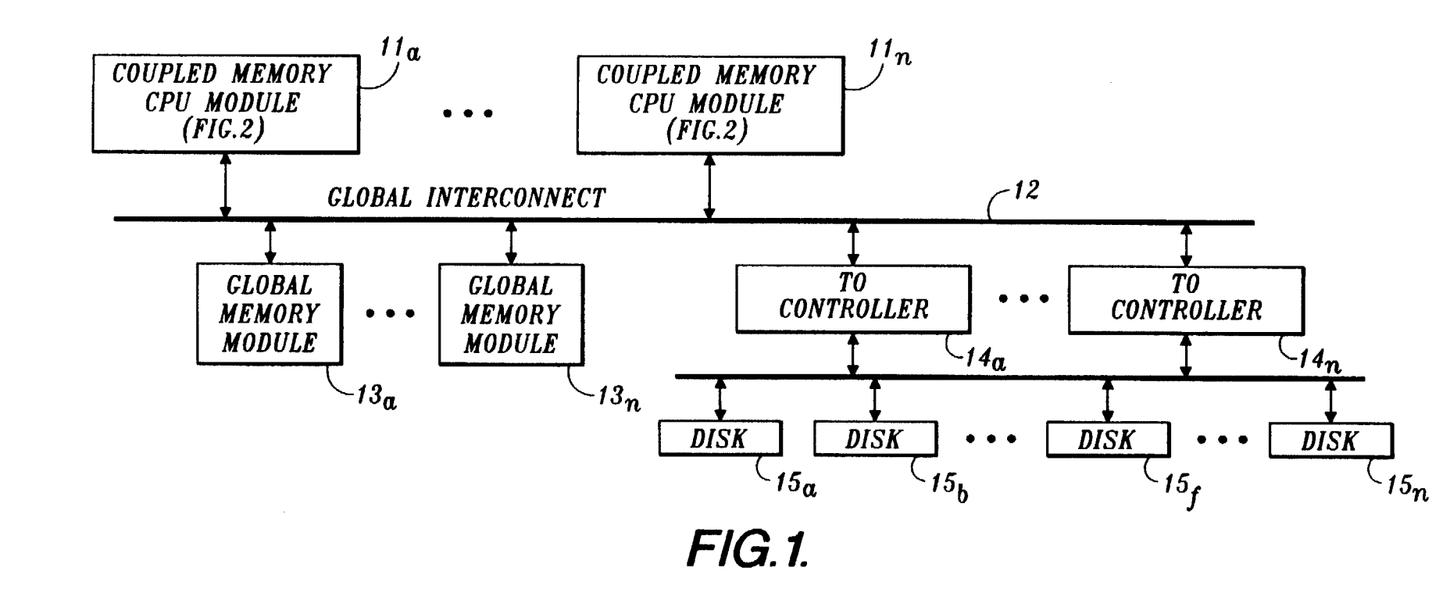
FIG. 1 is a block diagram of a CM multiprocessor computer system.
Figure 2:
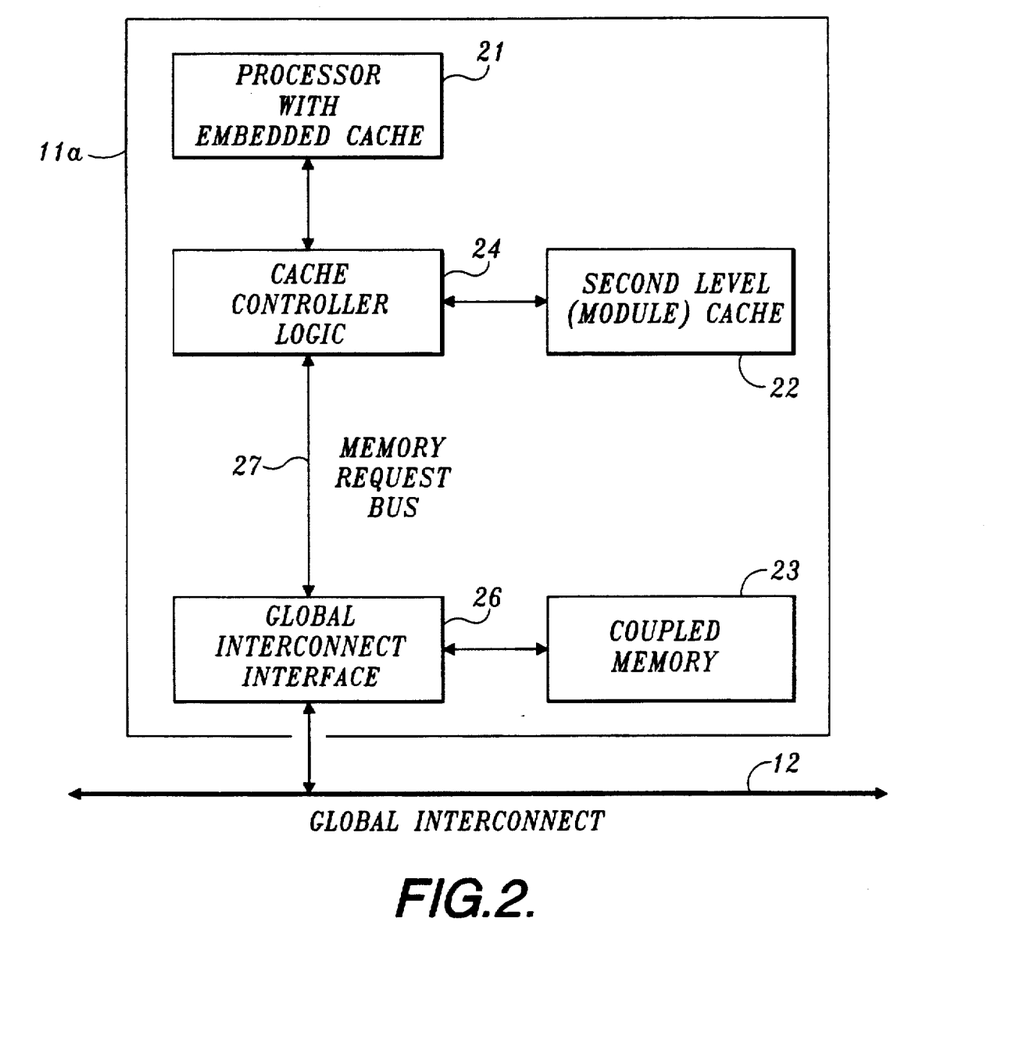
FIG. 2 is a block diagram of a coupled memory CPU module suitable for use in the CM multiprocessor computer system illustrated in FIG. 1.

FIG. 1 is a block diagram of a CM multiprocessor computer system and FIG. 2 is a block diagram of CPU modules suitable for use in the multiprocessor computer system illustrated in FIG. 1. The multiprocessor computer system illustrated in FIG. 1 comprises a plurality of identical or substantially identical coupled memory (CM) CPU modules 11a . . . 11n; a global interconnect 12; one or more optional global memory modules 13a . . . 13n; one or more input/output (I/O) controllers 14a . . . 14n; and one or more permanent storage mediums, such as disks 15a, 15b . . . 15n.

As shown in FIG. 2, each CPU module 11a . . . 11n includes: a processor with an on-chip (i.e., embedded) cache memory 21; a second level (module) cache memory 22; a region of coupled memory (i.e., a CM region) 23; cache controller logic 24; a global interconnect interface 26; and a memory request bus 27. Also shown in FIG. 2 is the global interconnect 12.

As will be readily appreciated by those skilled in the art, from viewing both FIGS. 1 and 2 and the foregoing description, the CM multiprocessor computer system illustrated in FIG. 1 has five levels of memory hierarchy. Each level of memory hierarchy increases the latency to access its data, i.e., the time required for data to be supplied to a processor requesting the data. The first level is the cache memory integrated with the processor. This level has the shortest access latency. The second level of the hierarchy is the module cache memory 22. Level three is the CM region 23, which is directly coupled to the CPU and is considerably larger than the module cache memory 22. Level four is the global memory modules 13. The global memory modules are located where the traditional system memory is located in uniform memory access multiprocessor systems. This is the first hierarchical level requiring use of the global interconnect 12. Level five is the storage disks 15. Because the CM region 23 is directly coupled to its associated processor, that processor can access data in the CM region without using the services of the global interconnect 12. On the other hand, if the processor of one CPU module, 11a, needs data from the CM region of another CPU module, 11b, that data in the CM region of the remote CPU module is available to the processor of the requiring CM module, 11a, via the global interconnect 12. As a result, data, instructions, etc., stored in any memory, global or CM, is available to the processors of all CPU modules. This both preserves and efficiently implements the shared memory multiprocessor programming environment that is preferred by software engineers. Obviously, access latency is substantially less for a processor seeking data from its local coupled memory than for a processor seeking data from the coupled memory of another CPU module or from a global memory module.

The present invention is directed to providing a method of assigning pages to memory so that the most frequently accessed data is physically closest to the processor using that data. More specifically, the memory management method of the present invention is designed to allocate process data and stack pages to the coupled memory region associated with the processor to which the process has been assigned.

Multiprocessing systems of the type illustrated in FIG. 1, as well as other multiprocessing systems, are, of course, controlled by an operating system. While the operating system can run on a processor that is independent of the CPU modules 11a . . . 11n used to carry out processes associated with applications programs, preferably one of the CPU modules is assigned the task of performing the functions of the operating system at system startup. Regardless of how the functions of the operating system are performed, the present invention, in essence, is a modification of the operating system designed to carry out the functions generally set forth above. Since the specific nature of the operating system can vary and does not form part of the present invention, a specific operating system is not described here. Rather, only the operating system modifications designed to carry out the present invention are described.

It is required for the present invention that processes have at least a soft affinity to a given CPU module and it is assumed that embodiments of the present invention will include an affinity-based process scheduler within the operating system. A suitable affinity-based process scheduler is described in U.S. patent application Ser. No. 07/649,844, more fully referenced above and incorporated herein by reference.

In a computer system with virtual memory, physical memory is divided into fixed-sized portions called page frames. Depending on the computer, the size of a page frame may be 512 bytes, 1024 bytes, 4096 bytes, etc. It is always a power of two. In order for a user to run a program, a computer operating system creates a process. Associated with the process is the amount of memory the program needs in order to execute. In a virtual memory system, process memory is described by a page map or page table that translates process specific memory addresses (called virtual addresses) to computer system physical addresses that will actually be used to access the computer system memory. Process memory is divided into fixed-sized portions called virtual pages (or just pages) that are the same size as memory page frames described above. The page table consists of an array of entries called page table entries (or PTEs). Each PTE corresponds to a region of the process's virtual address space. For example, on a system with 512 byte-sized page frames, the first PTE would correspond to process virtual address 0 to 511. The second PTE would correspond to process virtual address 512 to 1023, etc.

Each PTE contains a pointer to a physical memory page frame that actually contains the the data for the region of process virtual address space mapped by the given PTE. The computer system contains address translation hardware to take a process virtual address and translate it to a physical address by looking up the corresponding PTE which maps the virtual page. The operating system memory management software is responsible for assigning physical memory pages to a process and setting up the necessary page table mapping. The present invention manages coupled memory by changing the memory management software so that it will allocate the appropriate coupled memory or global memory page frame when a page is allocated to a process. Data and stack pages are allocated in the CM region of the CPU module to which the process is assigned. Text, system, and shared memory pages are allocated in the global memory region, if present, along with the resident kernel and its data structures. If global memory modules are not present, these items are allocated to one or more of the CM regions.

Figure 3:
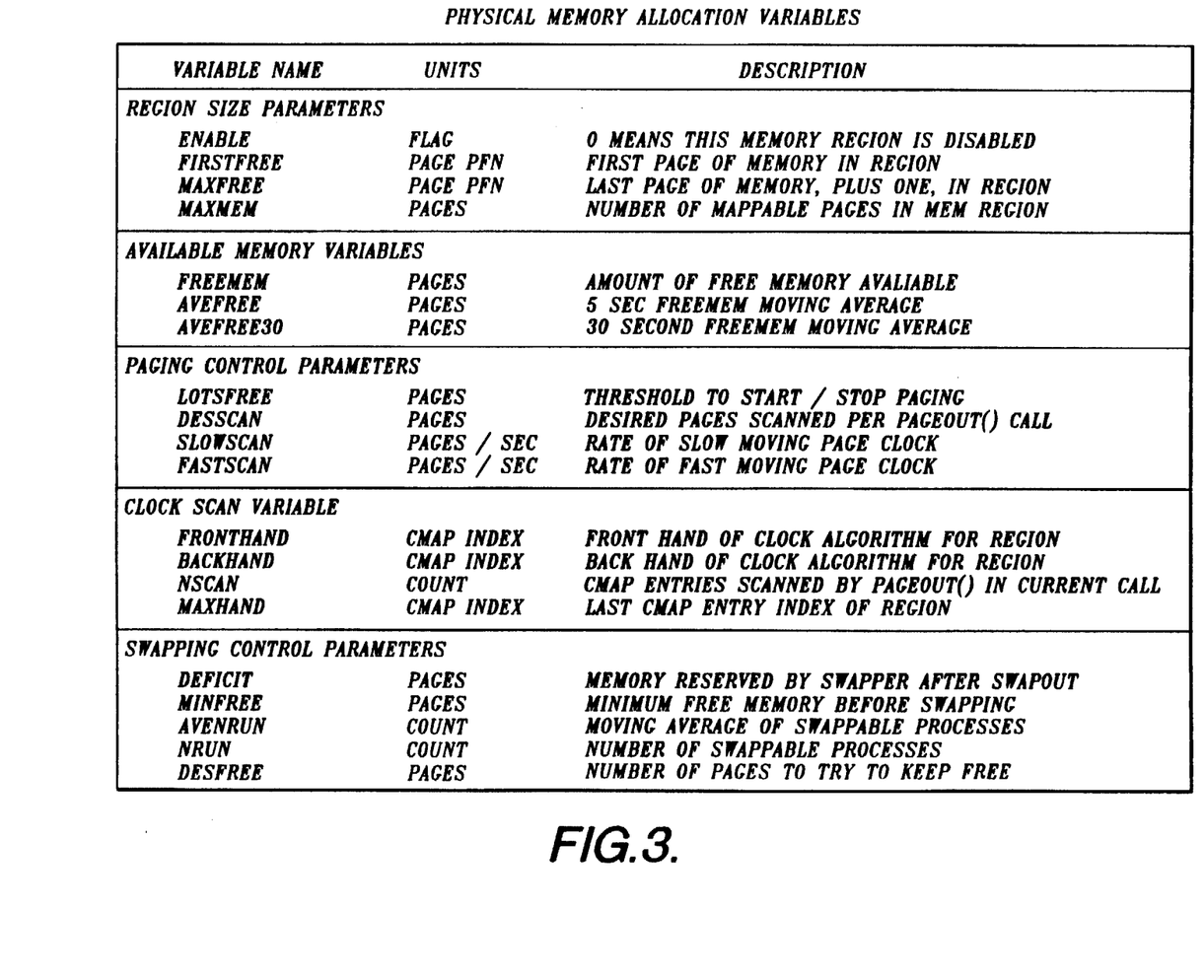
FIG. 3 is a table of physical memory allocation variables.

Data structures are necessary to divide memory into one global and n coupled memory regions. By way of example, the system variables that govern physical memory allocation and management in the Ultrix operating system (manufactured by Digital Equipment Corporation, the assignee of this application and the associated invention) are shown in FIG. 3. In accordance with this invention, a data structure definition combines all of these variables, and a unique copy of the structure is created for each CM region and one for the global memory region.

Figure 4:
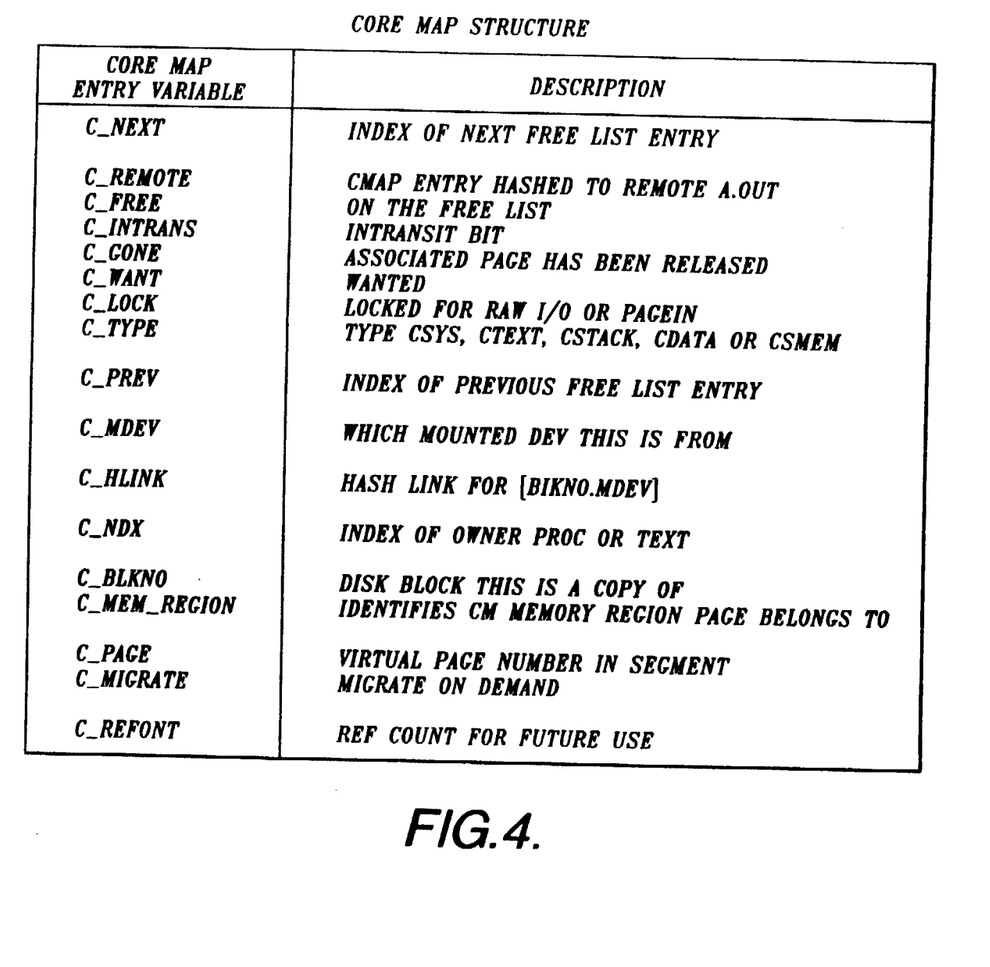
FIG. 4 is a core map structure table.

In order to manage physical memory allocation and track page usage, a data structure, called a core map, is maintained for each physical page of memory. FIG. 4 illustrates a suitable core map. Since core maps are well known and widely used, they are not described in detail here. For more information on core maps, see *The Design and Implementation of the 4.3 BSD UNIX Operating System*, by S. Leffler, M. K. McKusick, M. Karels and J. S. Quartermain, published by Addison-Wesley, Reading, Mass., 1989. Suffice it to say that in order to synchronize changes to the core map by multiple processors, the operating system must first acquire a core map lock using special hardware synchronization instructions. Once the changes are made to the core map the core map lock is released.

The core map data base describes how each page of available (i.e., excluding the resident system) physical memory is allocated. As shown in FIG. 4, each core map entry includes forward and backward free list links, a pointer to the process or text segment (text segments are shared system wide) that owns the page, the virtual page number in the segment, information describing where this page resides on disk, as well as other miscellaneous flags. From the core map entry, a page daemon (illustrated in FIG. 8 and described below) can get to the PTE of the process (or text segment) that owns the page.

Preferably, the core map entry link values are offsets into the core map array. Core map entry zero serves as the head of the free list for the global memory region. Entries "−1", "−2", ... of the core map are the free list heads of the coupled memory regions of CPU module 1, 2, etc. When the free list is initialized, the pages in the memory region simulating the global memory are put on the global memory free list and the pages of each CM region are put on their respective free lists. For convenience, preferably, some spare bits in the core map entries record with which memory region each page is associated. This saves having to translate the physical address in order to place a freed page on the correct free list.

When a process releases virtual memory, its pages are placed on the front of the appropriate free list. When the backhand of the paging daemon (illustrated in FIG. 8 and described below) sweeps across a page that is still invalid (i.e., not referenced by a processor), the page is put on the tail of its region's free list so that it won't be reallocated immediately. Even though the page is on the free list and the process PTE is marked invalid, the PTE still points to the page. As described more fully below, until the page is reallocated, the page can be reclaimed from the free list and reattached to the process.

Figure 5:
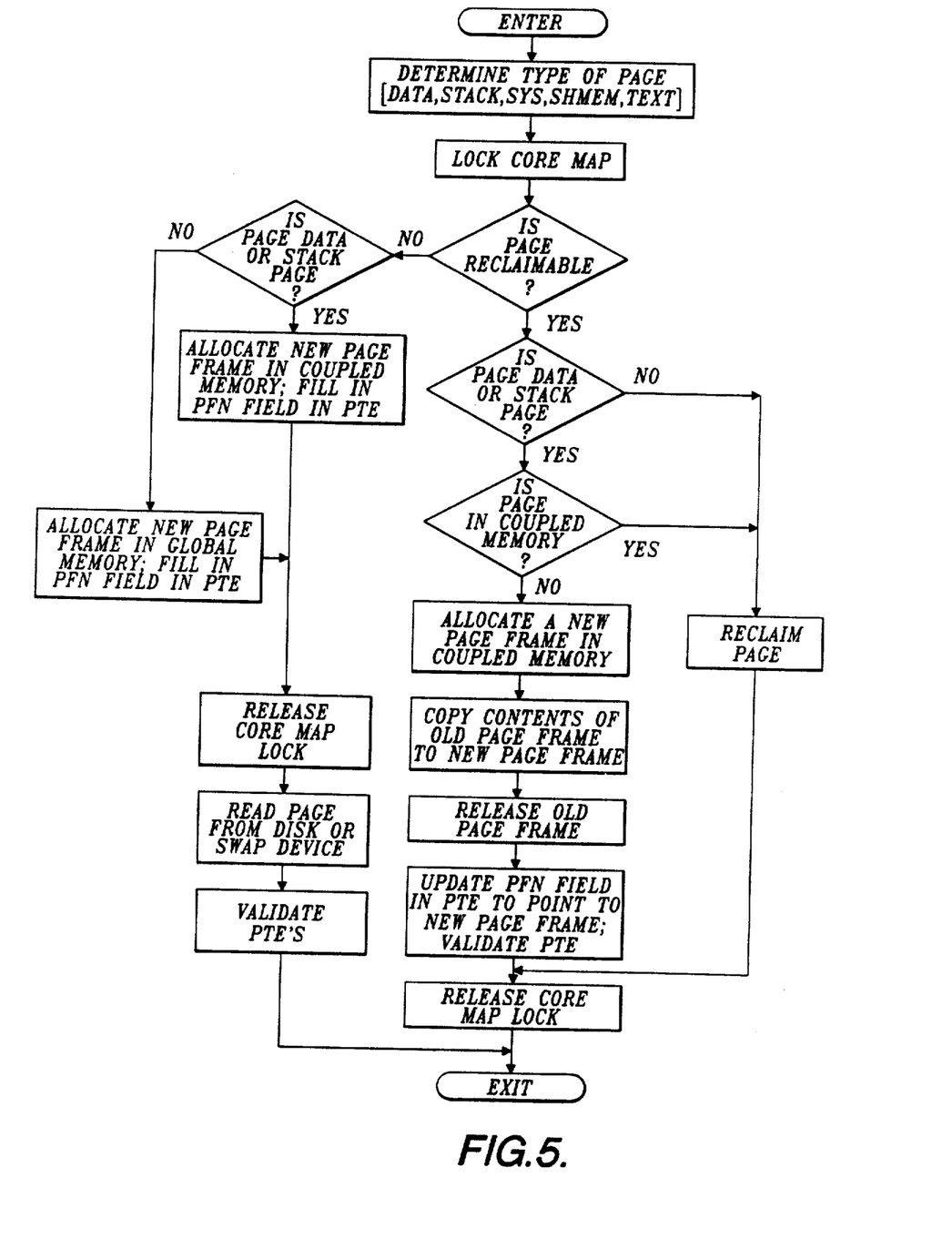
FIG. 5 is a flow diagram illustrating a procedure for handling a memory management page fault exception in order to allocate a new physical memory page or to migrate a page from one CM region to another in response to a process that has migrated.

Physical memory is allocated to a process in response to a page fault. FIG. 5 is an overview of page fault handling. First the type of page (data, stack, system, shared memory or text) is determined. Then, the core map is locked. Next a test is made to determine if the page is reclaimable. This is done by checking to see if the page is on the free list of the CM region related to the processor causing the page fault or on the free list of the global memory (or on the free list of the CM region of another CPU module). If the page is not reclaimable then a new page is allocated, either in Coupled Memory (CM) or global memory. If this page is either a data or stack page the page is allocated in coupled memory. If the page is a system, shared memory or text page, the page is allocated in global memory (if the system includes global memory). Simultaneously, the PFN field is filled in. Next the core map lock is released. Then the page is either zeroed or filled from a file on disk and the PTE validated.

A page is reclaimable if either (1) its valid bit is clear and it is not on the free memory list or (2) it is on the free memory list. The first case occurs when the paging daemon (illustrated in FIG. 8 and described below) is checking for references to pages and is referred to as a fast reclaim. The second case occurs when the paging daemon has placed the page on the free list so it can be reallocated. Up until the time the page is reallocated it can still be reclaimed by the process that owns it.

Returning to FIG. 5, if the page is reclaimable, the page is checked to see if it is a data or stack page. If the page is not a stack or data page, the page is reclaimed and the core map lock is released. If the page is a data or stack page, a check is made to see if the page is in the CM region of the CPU module assigned to the process. If the data or stack page is in the correct CM region, it is reclaimed and the core map lock released. If the page is a data or stack page and is not in the correct CM region, a new page in the correct (local) CM region is allocated, the contents of the remote page is copied into the local CM region and the remote page is released. Then the PFN field of the PTE is updated to point to the new page and the valid bit in the PTE is set. Thereafter, the core map lock is released.

Figure 6:
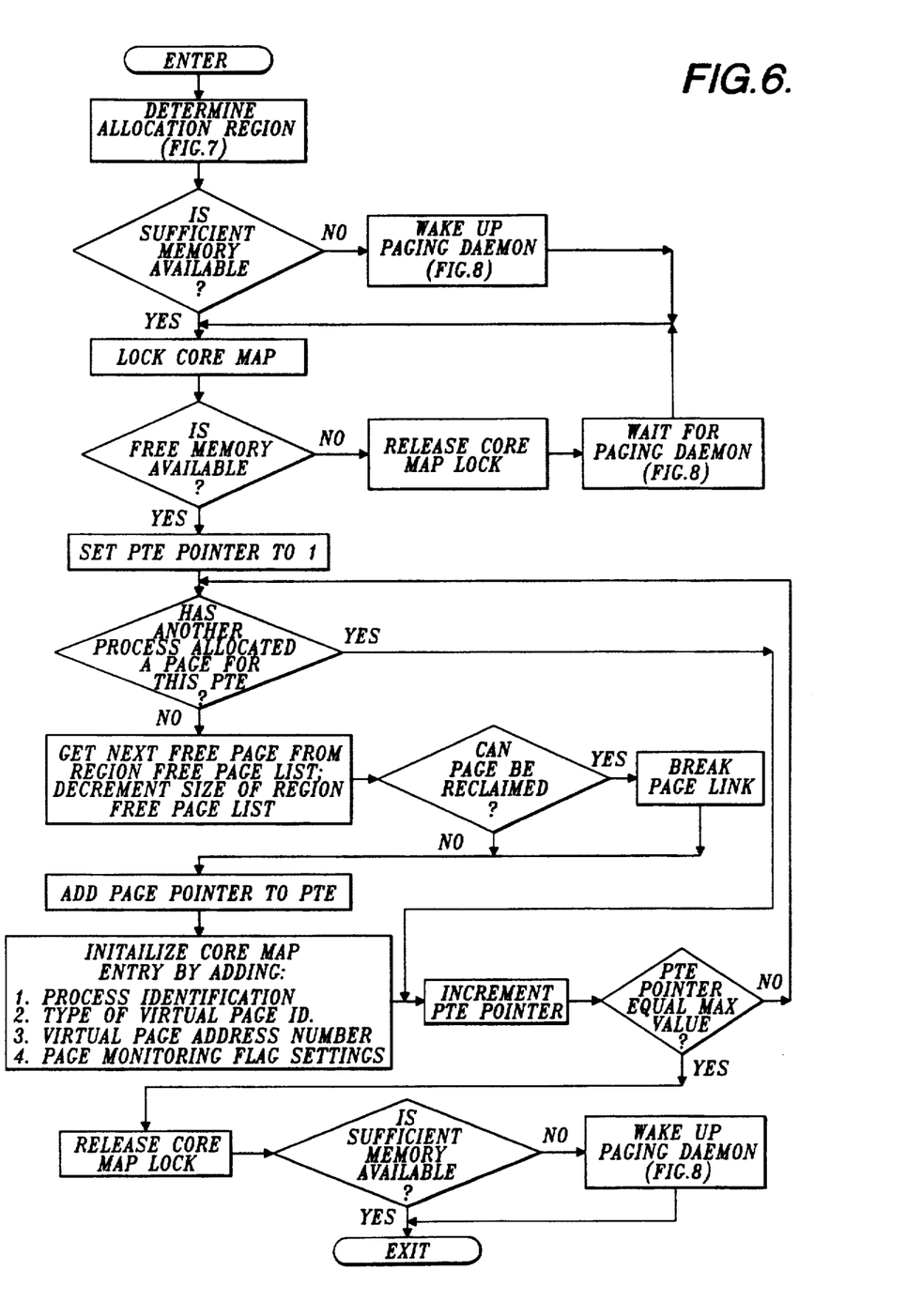
FIG. 6 is a flow diagram illustrating a procedure for allocating a physical memory page in either a CM region or global memory.

FIG. 6 is an overview of physical page allocation. The page fault process calls the code used to make a physical page allocation when it becomes necessary to allocate a new page of memory. The first step in the physical page allocation process is a determination of which memory region the page is to be allocated. This is accomplished in the manner illustrated in FIG. 7 and described below. Briefly, if the page is a newly created data or stack page, it is allocated to a CM region; otherwise, the page is allocated to global memory, provided, of course, the system includes global memory. If the page is a remote page to be migrated into a CM region, a CM page is allocated. If a failure to allocate a page occurs because either coupled memory or global memory is unavailable, the calling processor sleeps until the paging daemon creates additional free memory. More specifically, as illustrated in FIG. 6, if insufficient memory is available, the processor wakes the paging daemon, which creates additional memory in the manner described below. If sufficient memory is available, the core map is locked. Then, a test is made to determine if an adequate amount of free memory is available. If an adequate amount of free memory is not available, the core map lock is released and the system waits for the paging daemon to create additional free memory.

If free memory is available, the PTE pointer is set equal to one. Then a test is made to determine if another process has allocated a page for the PTE being pointed to. If another process has allocated a page for the PTE being pointed to, the PTE pointer is incremented. Then a test is made to determine if the PTE pointer is equal to the maximum PTE pointer value. If the PTE pointer is not equal to the maximum value, the test designed to determine if another process has allocated a page for this PTE is performed. If another process has not allocated a page for the PTE being pointed to, a free page from the head of the appropriate region's free page list is allocated. Then a test is made to determine if the page is still reclaimable. A page would not be reclaimable, for example, if the previous process that owned the page had terminated and deleted its virtual memory. If the page is still reclaimable, the link between the page and the previous owner is broken. Then the PTE in the process page map is updated to point to the new page. Thereafter, the core map entry is initialized by adding process identification, the type of virtual page ID, the virtual page address number and page monitoring flag settings. Thereafter, the PTE pointer is incremented and the test to determine if the PTE pointer value is equal to the maximum value is performed. When the PTE pointer value equals the maximum value, the core map lock is released. Thereafter, a test is made to determine if sufficient memory is available. If sufficient memory is not available, the processor wakes the paging daemon, which creates more free memory. Thereafter, the physical page allocation process terminates.

Figure 7:
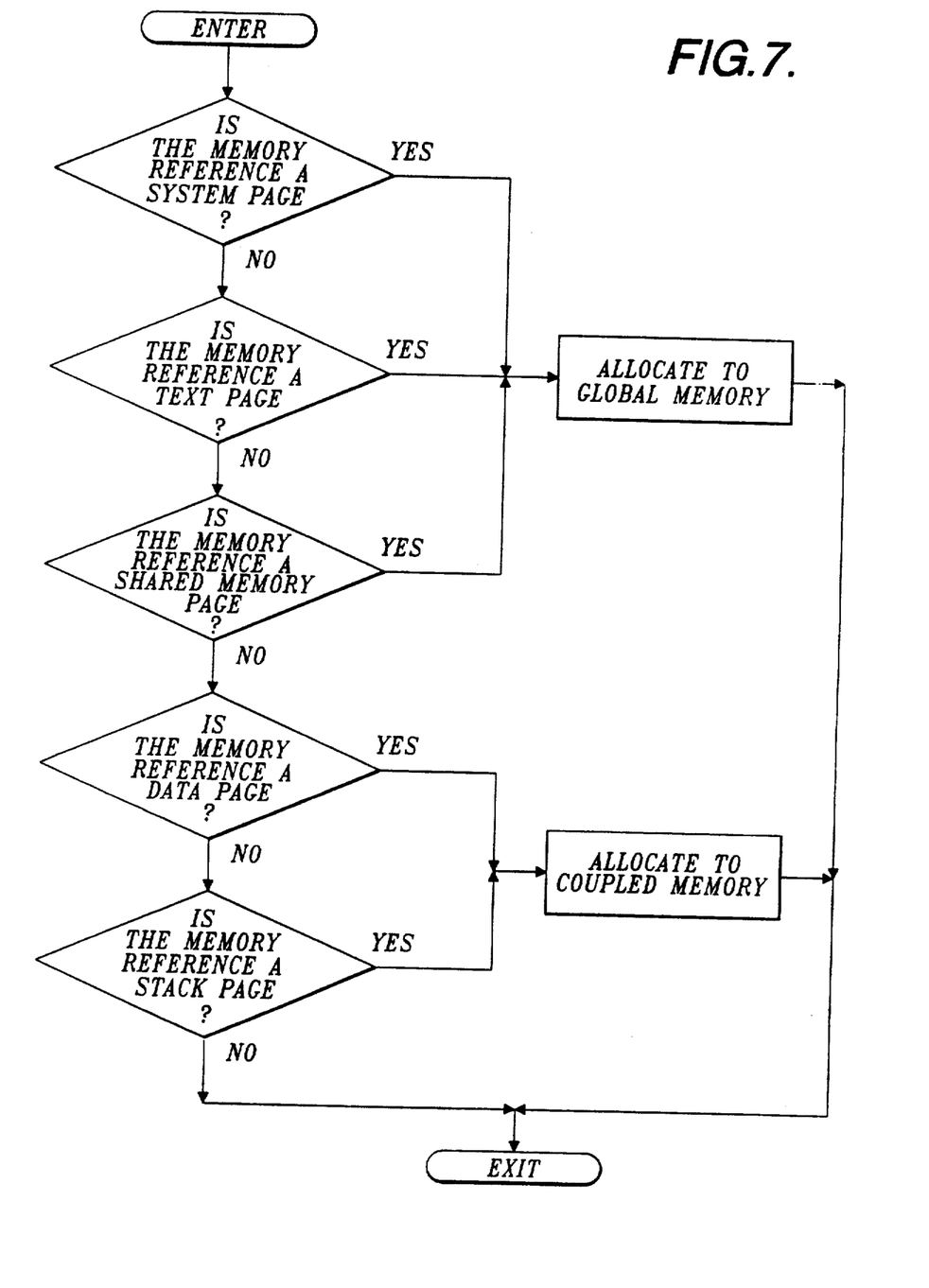
FIG. 7 is a flow diagram illustrating a decision process for deciding in what memory region to allocate a memory page when the page is first created.

FIG. 7 illustrates how the operating system software decides in what memory region a new physical memory page is to be allocated. If the requested page is either a data page or a stack page, the page is allocated to the CM region included in the CPU module assigned to execute the process. If the request is for either a shared memory page, a text (i.e., instruction) page, or a system page, the page is allocated from the global memory region. In addition, the resident kernel, all of its resident data structures, and the file system cache are allocated in the global memory region, provided, of course, the system includes global memory. If the system does not include global memory, shared memory pages, text pages, and system pages are allocated to the CM region of the CPU module to which the process is assigned. Since these pages can be potentially shared by multiple processes, they may be migrated at a later date to the CM region of another CPU module. The resident kernel and its resident data structures, as well as the file system cache, could either be assigned to one CM region, or distributed among all CM regions when the system is initialized if no global memory is present.

Free memory is maintained by a process for scanning the physical memory pages in each memory region to determine if they can be reused, i.e., a paging daemon. More specifically, the data structure (FIG. 3) keeps track of the amount of free memory (freemem) in each memory region. When freemem in any region drops below an acceptable level, the paging daemon frees up some memory. The paging daemon runs at regular prescribed intervals, or when awakened (FIG. 6). The paging daemon frees up memory by taking less frequently used pages away from processes and placing those pages on the free list of the respective memory region.

Figure 8:
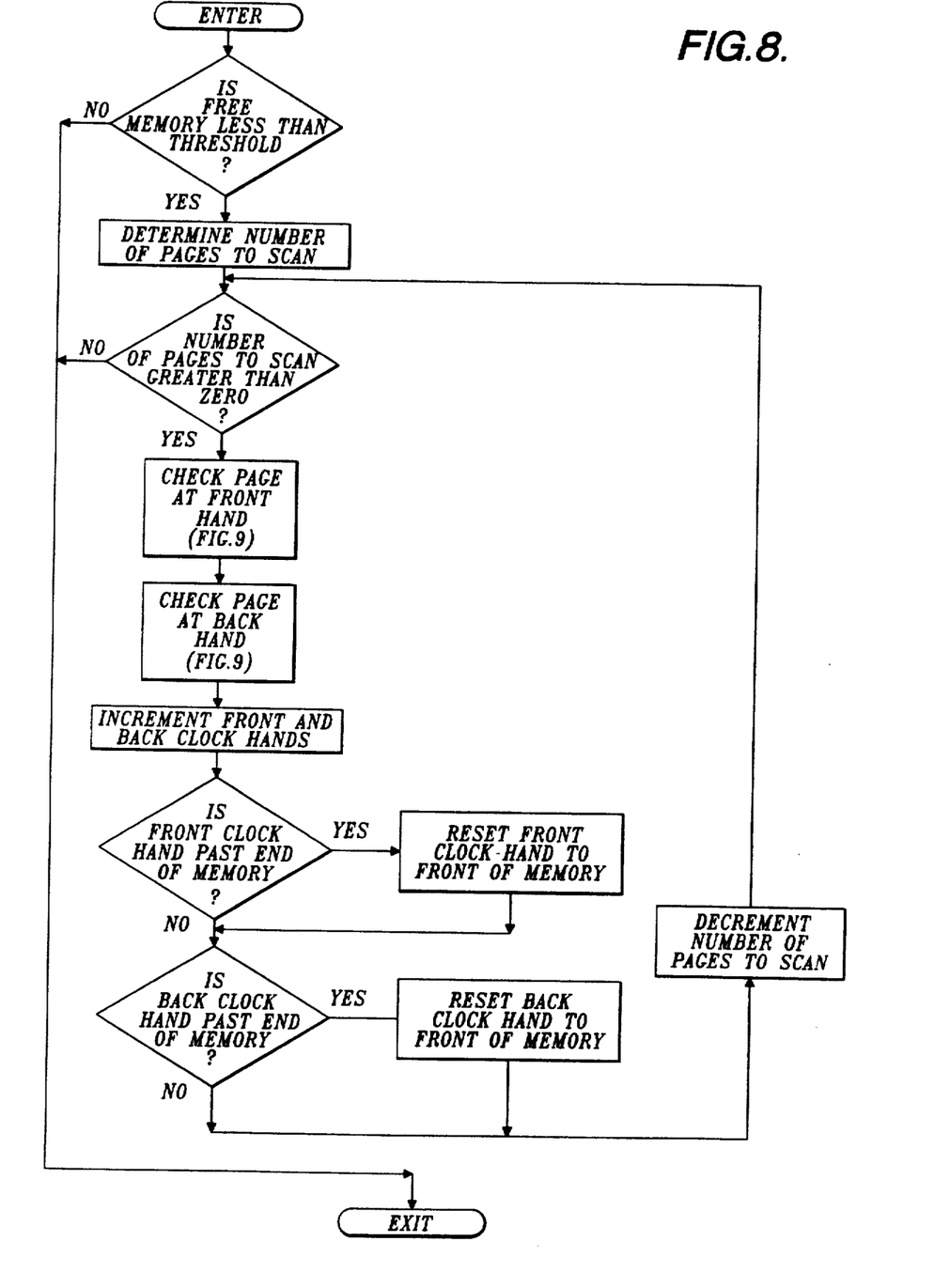
FIG. 8 is a flow diagram illustrating a procedure for scanning physical memory pages in each memory region to determine if they can be reused.
Figure 9:
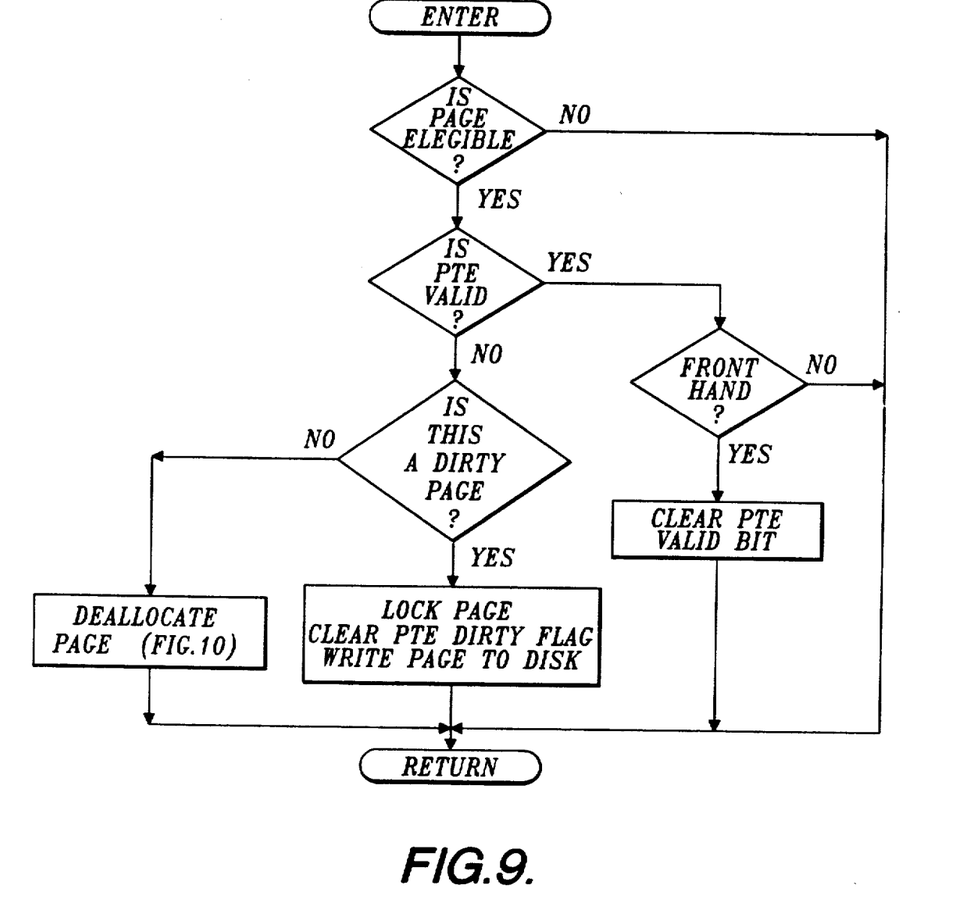
FIG. 9 is a flow diagram illustrating a procedure for identifying infrequently used physical memory pages and writing dirty pages to disk so that the physical memory pages can be reused.

FIGS. 8 and 9 illustrate a suitable paging daemon which includes a two-handed clock algorithm used to simulate reference bits. In this algorithm, which is described more fully in *The Design and Implementation of the 4.3 BSD UNIX Operating System*, referenced more fully above, the front hand sweeps through the core map and invalidates the process PTE that points to the page. The back hand sweeps a fixed distance (in terms of time or number of pages) behind the front hand and, when it encounters a page that is still invalid, puts the page on the tail of the free page list. Modified (dirty) pages are written to the swap device, i.e., disk.

A page fault occurring between the time the front hand invalidates the PTE of a specific page and the back hand checks the page will cause the page to be revalidated and returned to the process. As a result, the backhand will not place the page on the free list. This operation is called a fast reclaim. See FIGS. 5 and 6. Fast reclaim does not maintain per-process working sets. Instead, all processes page against the system memory. As shown at the beginning of FIG. 8, the kernel executes a routine called a schedule paging (schedpaging) routine a predetermined number (e.g., four) of times per second. The scheduled paging routine determines if free memory is in short supply (freemem is less than lotsfree) on a per-region basis. If free memory is in short supply, schedpaging computes a page scan rate between slowscan and fastscan, and then sets desscan to the number of pages to scan by the clock algorithm in the given memory region. The schedpaging routine then wakes up the paging daemon to execute the clock algorithm on each memory region where free memory is in short supply, putting unused pages on the free list.

The first step in the main part of the paging daemon is to determine if the number of pages to scan is greater than zero. If the number of pages to scan is greater than zero, checks of the pages at the front and back clock hands are made. The checks are illustrated in FIG. 9 and described below. Thereafter, the front and back clock hands are incremented. Then a test is made to determine if the clock hand is past the end of the memory region. If the front clock hand is past the end of the memory region, the front clock hand is reset to the front of the memory region. After the front clock hand has been reset or if the front clock hand is not past the end of the memory region, a test is made to determine if the back clock hand is past the end of the memory region. If the back clock hand is past the end of the memory region, the back clock hand is reset to the front of the memory region. After the back clock hand has been reset or if the back clock hand is not past the end of the memory region, the number of pages to scan in the memory region is decremented. Thereafter, the test of whether the number of pages to scan is greater than zero is repeated. If the number of pages to scan is still greater than zero, the foregoing cycle is repeated. The paging daemon ends when the number of pages to scan is zero.

Figure 10:
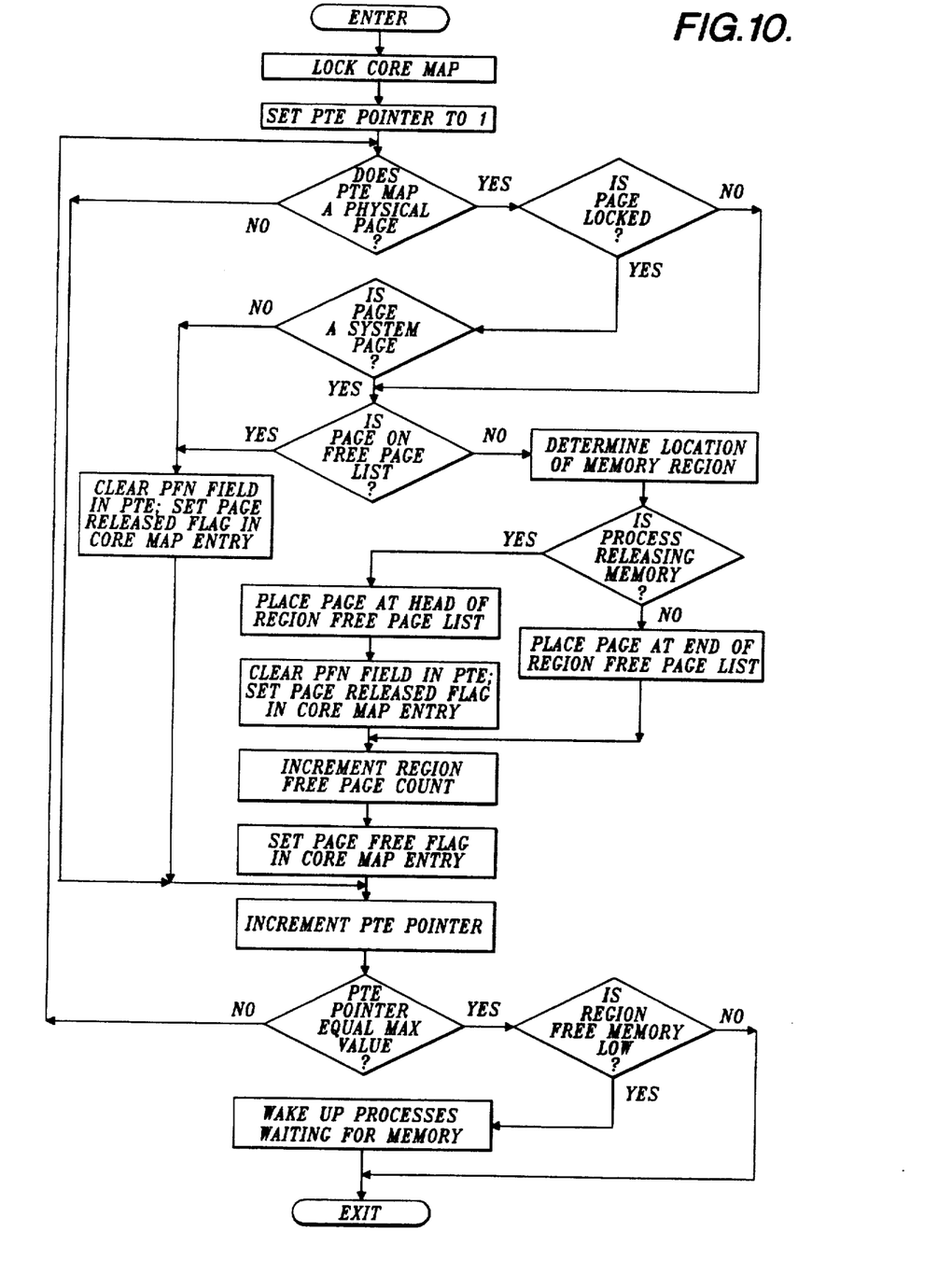
FIG. 10 is a flow diagram illustrating a procedure for deallocating a physical memory page in either a CM region or global memory.

FIG. 9 is an overview of the page front and back hand checks of the paging daemon illustrated in FIG. 8. First the test determines if the page is eligible for page out. The page must not be locked for input/output (I/O), not on the free list already, not a system page, and the owning process can't be locked for swapping or about to exit. All such ineligible pages are skipped. Next the PTE mapping the page is checked to see if it's valid. If the PTE is valid and the hand pointing to the page is the front hand of the clock, the PTE valid bit is cleared and the determination test is done with this page. If the hand pointing to the page is not the front hand, i.e., it is the back hand, the determination test is done because the PTE is valid, which indicates that the page has been reclaimed. If the PTE is not valid, a test is made to determine if the page is dirty, i.e., modified. If the page is not dirty then the page is deallocated, i.e., placed on the end of the region free list. The deallocation process is illustrated in FIG. 10 and described below. If the page is dirty, the page is locked, the PTE dirty flag is cleared and the I/O operation is initiated to write the page to disk. Later, after the I/O operation is completed, the page is placed on the end of the free list. If a process later tries to reference a page that has been written to disk, the page fault software will allocate a new physical memory page frame for it and retrieve the contents of the page from the disk.

In summary, in accordance with this invention, the paging daemon has certain features that enable it to be used in a computing system with coupled memory. First, the core map data structure that describes the owner of each page frame is partitioned into multiple segments, one for each memory region. Second, fronthand and backhand clock pointers are maintained for each memory region. Third, the paging daemon examines the amount of free memory in each memory region at periodic intervals and determines the appropriate number of pages to scan on a per-region basis.

FIG. 10 is a flow diagram that describes the deallocation of a physical memory page from a process and placing it on the memory free list associated with a given memory region. This can occur when the process is terminating and releasing its physical memory or the paging daemon is removing an infrequently used page from a process so as to make the physical memory page available to another process. The deallocation routine is applied to an array of PTEs whose associated physical memory pages are to be freed. The following steps are performed for each PTE in the array after the core map is locked and a PTE pointer is set to one (1). If the PTE does not map a physical memory page, it is skipped over. This occurs when the process never makes a memory reference to the virtual page mapped by this PTE. Next, if the physical memory page is locked (e.g., for I/O) and is not a system page, or if the page is already on the region free list, the page frame number (PFN) field of the PTE is cleared and the page released flag in the core map entry is set. Later when the physical memory page is finally unlocked (e.g., when the I/O operation completes) the page is placed on the appropriate memory region free list.

Continuing with FIG. 10, if the page is not on the region free list, the address of the page is checked to determine which memory region the page belongs to. If the page is being released by the related process (e.g., the process is terminating), the page is placed at the head of the memory region free list. The page is placed at the head of the free list rather than the end because the process is discarding the page and has no wish to reclaim the page in the future because the process is terminating. After being placed at the head of the free list, the PFN field in the PTE is cleared and the page released flag in the core map entry is set. If the process is not releasing memory, the page is placed on the tail of the memory region free list. The amount of region free memory is then incremented and the related page free flag is set in the core map entry. The PTE pointer is then incremented and the next PTE in the array is processed until all pages have been processed. This occurs when the PTE pointer equals its maximum value. Finally, if the region free memory is low, which means that other processes may be waiting to be allocated some memory, the processes waiting for memory are awakened.

When any physical memory region is so overcommitted that the paging daemon cannot maintain enough free memory even when running at the maximum page scan rate, a swapping process (not shown in the Figures) is enabled to move entire processes from memory to disk. Prior art algorithms for deciding when to begin the swapping out processes can be used except that they are applied on a per-region basis in a CM multiprocessor computer system. Swapout in a given memory region will occur when: both the 5- and 30-second moving average of freemem is less than desfree; the one-minute load average of in-memory swappable processes is greater than or equal to two; and either the system paging I/O rate is excessive, or the 5-second moving average of freemen is less than minfree.

It is preferable that each process run for its entire life on only one CPU module. This will yield the best benefit of coupled memory in terms of latency savings and reducing interconnect bandwidth. However, load balancing considerations may override these benefits, making it optimal to migrate a process from one CPU module to another. The process scheduling techniques used to load balance a CM multiprocessor system are described in U.S. patent application Ser. No. 07/649,844, filed Feb. 1, 1991, and entitled "Affinity Scheduling of Processes in Symmetric Multiprocessing Systems," the subject matter of which has been incorporated herein by reference. Preferably, the migration daemon described in that patent application runs once each second to balance the process load across the CPU modules. In general, the following procedure is used to migrate a process from one CPU module to another.

First, the migration daemon selects a process to migrate. Second, the process is removed from the run queue of the old CPU module. Third, a sweep is made through data and stack segments marking the PTEs invalid. (This is similar to the operation of the front hand of the clock algorithm during paging daemon process.) Next, the process and memory region affinity are changed. Finally, the process is placed on the run queue of the new CPU module.

Once a process resumes execution on its new CPU module, it will encounter a page fault when it references a data or stack page that resides in the CM region of its previously assigned CPU module. The page fault routine will detect that the page fault is due to a reference to a data or a stack page that does not reside in the coupled memory region of the new CPU module and will migrate the page from the CM region of the old CPU module to the CM region of the new CPU module, in the manner described above.

As will be readily appreciated from the foregoing description, the invention provides a method of managing the memory of a CM multiprocessor computer system. The CM multiprocessor computer system must include at least a plurality of CPU modules, to which processes are assigned, and a storage medium connected to the CPU modules by a global interconnect. Each of the CPU modules includes a processor and a coupled memory region that is accessible by the local processor without using the global interconnect. Processors have access to remote coupled memory regions via the global interconnect. Memory is managed by transmitting, from the storage medium, the data and stack pages of a process to the coupled memory region of a CPU module to which the process is assigned when called for by the process. At prescribed intervals, the free memory of each coupled memory region is evaluated to determine if it is below a threshold. If below the threshold, a predetermined number of pages of the coupled memory region are scanned. Infrequently used pages are placed on a list of pages that can be replaced with pages stored in the storage medium. If the CM multiprocessor computer system includes global memory, certain pages, such as system pages, text pages and shared memory pages, are allocated to global memory. If the CM multiprocessor computer system does not include a global memory, these pages are stored in the coupled memory regions of the CPU modules of the CM multiprocessor computer system.

While a preferred embodiment of the invention has been illustrated and described, it is to be understood that, within the scope of the appended claims, various changes can be made therein without departing from the spirit and scope of the invention.

The embodiments of the invention in which an exclusive property or privilege is claimed are defined as follows:

1. A method of managing the memory of a multiprocessor computer system including a plurality of CPU modules to which processes to be run on said computer system are assigned, said computer system also including a storage medium connected to said modules via a global interconnect, each of said CPU modules including a processor and a coupled memory region, said method comprising the steps of:

transferring, from said storage medium, the data and stack pages of a process to be run on said computer system to the coupled memory region of the CPU module to which the process is assigned; and determining, at prescribed intervals, if the free memory of each of said coupled memory regions is below a threshold and, if below the threshold, scanning a predetermined number of pages and placing infrequently used pages on a list of pages that can be replaced with pages stored in said storage medium.

2. A method of managing the memory of a multiprocessor computer system as claimed in claim 1 wherein said multiprocessor computer system also includes global memory connected to said plurality of CPU modules and said storage medium via said global interconnect and including the step of transferring, from said storage medium, pages other than the data and stack pages of a process to be run on said computer system to said global memory.

3. A method of managing the memory of a multiprocessor computer system as claimed in claim 2 wherein said steps of transferring data and stack pages to the coupled memory region of the CPU module to which a process is assigned and said step of transferring pages other than data and stack pages of a process to be run on said computer system to said global memory includes a page fault process.

4. A method of managing the memory of a multiprocessor computer system as claimed in claim 3 wherein said page fault process first determines if a page is in said coupled memory regions or said global memory and, thus, is reclaimable before transferring a page to the appropriate one of said coupled memory regions and said global memory.

5. A method of managing the memory of a multiprocessor computer system as claimed in claim 4 wherein reclaimable pages other than data and stack pages are reclaimed in global memory and wherein data or stack pages located in the coupled memory region of a CPU module to which a process has been assigned are reclaimed in said coupled memory region.

6. A method of managing the memory of a multiprocessor computer system as claimed in claim 5 wherein reclaimable pages not located in the coupled memory of the CPU module to which a process is assigned are copied into the coupled memory of the CPU module to which a process is assigned.

7. A method of managing the memory of a multiprocessor computer system as claimed in claim 6 wherein nonreclaimable data and stack pages are allocated to the coupled memory of the CPU module to which a process is assigned and wherein nonreclaimable pages other than data and stack pages are allocated to global memory.

8. A method of managing the memory of a multiprocessor computer system as claimed in claim 1 or 2, including a paging daemon associated with each coupled memory region of each CPU module to which processes can be assigned.

9. A method of managing the memory of a multiprocessor computer system as claimed in claim 8 wherein said paging daemon: (i) determines the number of pages to scan if the free memory of a particular region is less than a threshold; (ii) on a page-by-page basis, determines if each page of the number scanned is still in use; and (iii) deallocates pages not in use by placing them either at the head or the end of a free page list associated with the particular region running the paging daemon.

10. A method of managing the memory of a multiprocessor computer system as claimed in claim 9 wherein said paging daemon includes front and back clock hands programmed to point at spaced-apart pages, said clock hands being incremented after each determination of whether a page is still in use.

11. A method of managing the memory of a multiprocessor computer system as claimed in claim 10 wherein said step of determining if a page is still in use includes a determination of whether a page is dirty and writing dirty pages to disk before they are deallocated.

12. A method of managing the memory of a multiprocessor computer system as claimed in claim 11 wherein pages associated with terminating processes are placed at the head of the free page list of the associated coupled memory region and other pages are placed at the end of the free page list of the associated coupled memory region.

13. A method of managing the memory of a multiprocessor computer system as claimed in claim 2 wherein said step of transferring, from said storage medium, data and stack pages to the coupled memory region of the CPU module to which a process is assigned and the step of transferring, from said storage medium, pages other than data and stack pages to global memory includes a page allocation routine.

14. A method of managing the memory of a multiprocessor computer system as claimed in claim 13 wherein said page allocation routine allocates pages other than data and stack pages to global memory and allocates data and stack pages to the coupled memory of the CPU module to which a related process is assigned.

15. A method of managing the memory of a multiprocessor computer system as claimed in claim 14, including a paging daemon associated with each coupled memory region of each CPU module to which processes can be assigned.

16. A method of managing the memory of a multiprocessor computer system as claimed in claim 15 wherein said paging daemon: (i) determines the number of pages to scan if the free memory of a particular region is less than a threshold; (ii) on a page-by-page basis, determines if each page of the number scanned is still in use; and (iii) deallocates pages not in use by placing them either at the head or the end of a free page list associated with the particular region running the paging daemon.

17. A method of managing the memory of a multiprocessor computer system as claimed in claim 15 wherein said page allocation routine wakes up said paging daemon if sufficient memory is not available in the memory region to which a page is allocated.

18. A method of managing the memory of a multiprocessor computer system as claimed in claim 17 wherein said page allocation routine waits for said paging daemon to be executed if adequate free memory is not available in the memory region to which a page has been assigned.

* * * * *